UNITED STATES PATENT OFFICE.

HENRY M. CONGER, OF WASHINGTON, DISTRICT OF COLUMBIA.

COMPOSITION SHEET OR LABEL.

1,163,894.      Specification of Letters Patent.      Patented Dec. 14, 1915.

No Drawing.      Application filed December 24, 1913. Serial No. 808,587.

*To all whom it may concern:*

Be it known that I, HENRY M. CONGER, citizen of the United States, residing at Washington, District of Columbia, have invented certain new and useful Improvements in Composition Sheets or Labels, of which the following is a specification.

It has been proposed heretofore to apply a label of soluble material to meat carcasses, said label carrying the label subject printed in reverse on the face which is to contact with the meat so that the ink which is of transfer or copying character, and indelible, will enter the pores of the meat, properly mark the same, and show through the compound sheet, or if this sheet is destroyed or disappears the markings will remain on the meat itself. In carrying out my invention I aim to provide an adhesive label sheet which will unite with the meat by simply pressing it thereon, and will become substantially a homogeneous part of the meat in so far that it can not be removed without destroying its form and the continuity of its body, thus preventing the label when once applied from being removed from one carcass or body and placed on another body of meat. The sheet of material may be said to be inherently adhesive in that it requires no addition of adhesive paste or other like material either to the meat or to the label itself.

In carrying out my invention, I employ gelatin as the body of my material, with which is mixed corn starch, glycerin and water, and the quantities of said ingredients are substantially in the proportions of six ounces of gelatin, eight ounces of corn starch, six to nine drams of gylcerin, and nine pints of water. In making the mixture I take, in a cold state, a sufficient quantity of the water to dissolve the corn starch. I take the remaining quantity of water and bring it to the boiling point, and introduce the gelatin and thoroughly dissolve it, stirring it meanwhile. By this action the gelatin is scalded but not cooked. I then add the dissolved corn starch, this being done while the gelatin solution is still substantially at the boiling point of the water so that scalding of the corn starch is effected, but not cooking. It is desirable to avoid cooking the corn starch as under this condition it would become pasty. This composition is well stirred for a few minutes, and then glycerin of commerce, *i. e.* in syrupy form, is next added in its unheated state, and while the mixture is still hot and either substantially at the boiling point or after the mixture has slightly cooled. The mixture is now ready to be formed into the required shape for use, for instance like a film or sheet, and I prefer to produce it in a continuous sheet capable of being rolled up like thin paper, though the invention is not limited in this respect.

In delivering the fluid mixture onto the surface upon which it is to set into film or sheet form, the mixture is held in a tank and is agitated periodically to prevent precipitation of any of its ingredients. The mixture is kept warm and is delivered in this state so that it will be of the proper fluidity, and this delivery takes place upon a cold receiving surface in the form of a thin film whereupon the composition is immediately chilled, and it will set in exactly the thickness and width in which it is delivered, and after the setting action has taken place it is stripped from said cooling or setting surface and is in the form of a film or sheet ready for use, as may be desired. While setting, the material may be subjected to forced drying by an air blast.

Of the above ingredients the gelatin may be said to constitute the body of the compound, the corn starch the filler, and the glycerin acts as a preservative and imparts softness to the material.

The material has considerable tensile strength, and when in sheet form will resist to a considerable degree tearing or breaking strains. It is as flexible as thin paper, not brittle, and can be creased or folded without cracking. Being inherently adhesive, as before stated, it may be applied to moist substances by simply pressing it thereon, and when applied to meat it requires no additional agent to make it adhere thereto. Being soluble, it is taken up by the meat to a more or less extent and its homogeneity or continuity is broken up by the filler when acted on by the moisture of the meat and these characteristics together with the inherent adhesiveness of the film renders it impossible to remove the film for use again in marking another piece of meat, being thus admirably adapted as a carrier for label subject matter to be impressed on or in the meat without the possibility of a second fraudulent use. The soluble material seals the pores of the carcass, retains the ink in place, prevents its exudation, and that portion which is not dissolved or absorbed remains as a tightly fitting flexible protecting covering for the label subject matter which is printed in reverse on the inner or reverse side thereof. Its use provides a non-detachable, legible mark which will resist all ordinary abrasive actions thereon. Being innocuous to health, the sheet material may be used as a wrapper for food products.

The corn starch is mentioned as representative of any starch or like ingredient which may be found suitable for the purpose of a filler, giving bulk or body to the compound at little expense.

I claim as my invention:—

1. The hereindescribed film for marking meat consisting of a sheet of inherently adhesive, soluble, non-friable material carrying label subject matter printed thereon in transfer ink, said sheet comprising gelatin, glycerin and a filler to break up the continuity of the gelatin and glycerin composition, substantially as described.

2. The hereindescribed film for marking meat consisting of a sheet of inherently adhesive, soluble, non-friable material carrying label subject matter printed thereon in transfer ink, said sheet comprising gelatin, glycerin and a filler of starch to break up the continuity of the gelatin and glycerin composition, substantially as described.

In testimony whereof, I affix my signature in presence of two witnesses.

HENRY M. CONGER.

Witnesses:
RALPH H. CASE,
A. McCOY HANSON.